(12) United States Patent
Gore

(10) Patent No.: US 6,989,210 B2
(45) Date of Patent: Jan. 24, 2006

(54) FUEL CARTRIDGE WITH THERMO-DEGRADABLE BARRIER SYSTEM

(75) Inventor: Makarand P. Gore, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 394 days.

(21) Appl. No.: 10/423,367

(22) Filed: Apr. 23, 2003

(65) Prior Publication Data

US 2004/0214056 A1    Oct. 28, 2004

(51) Int. Cl.
*H01M 8/18*    (2006.01)

(52) U.S. Cl. ....................................... 429/20
(58) Field of Classification Search .................. 429/20
See application file for complete search history.

(56) References Cited

U.S. PATENT DOCUMENTS

| | | | |
|---|---|---|---|
| 4,493,878 A | 1/1985 | Horiba et al. | 429/12 |
| 5,504,471 A | 4/1996 | Lund | 338/320 |
| 5,644,342 A | 7/1997 | Argyres | 347/12 |
| 6,007,186 A | 12/1999 | Erni | 347/59 |
| 6,416,892 B1 | 7/2002 | Breault | 429/13 |
| 6,475,652 B2 | 11/2002 | Grasso et al. | 429/13 |
| 2004/0076861 A1* | 4/2004 | Mann et al. | 429/24 |

* cited by examiner

*Primary Examiner*—Patrick Joseph Ryan
*Assistant Examiner*—Thomas H. Parsons

(57) ABSTRACT

In one of many possible embodiments, a fuel cartridge is provided including a first chemical reagent, a second chemical reagent, a thermally degradable barrier layer separating the first chemical reagent and the second chemical reagent, wherein the first chemical reagent and the second chemical reagent produce fuel if allowed to react, and a heater for heating the thermally degradable barrier layer.

14 Claims, 11 Drawing Sheets

FUEL CARTRIDGE WITH THERMO-DEGRADABLE BARRIER SYSTEM

BACKGROUND

During the past several years, the popularity and viability of fuel cells for producing large and small amounts of electricity has increased significantly. Fuel cells conduct an electrochemical reaction with chemicals such as hydrogen and oxygen to produce electricity and heat. Fuel cells are similar to batteries but fuel cells can be "recharged" while providing power. Fuel cells are also much cooler and cleaner than devices that burn hydrocarbons.

Fuel cells provide a DC (direct current) voltage that may be used to power motors, lights, computers, or any number of electrical appliances. There are several different types of fuel cells, each using a different chemistry. Fuel cells are usually classified by the type of electrolyte used. Fuel cell types are generally categorized into one of five groups: proton exchange membrane (PEM) fuel cells, alkaline fuel cells (AFC), phosphoric-acid fuel cells (PAFC), solid oxide fuel cells (SOFC), and molten carbonate fuel cells (MCFC).

Each of the fuel cells mentioned above uses oxygen and hydrogen to produce electricity. Ambient air typically supplies the oxygen for a fuel cell. In fact, for the PEM fuel cell, ordinary air may be pumped directly into the cathode. However, hydrogen is not as readily available as oxygen. Hydrogen is difficult to generate, store, and distribute for a number of reasons including posing a potential safety hazard. Consequently, strict safety precautions are taken in order to reduce potential safety hazards.

It can be undesirable to store large amounts of gaseous fuel (such as hydrogen) in a fuel cartridge because such storage can raise safety concerns and provide less than optimal energy density. Moreover, in those instances where fuel-containing substances are stored in a fuel cartridge, conventional devices for causing the gaseous fuel to be released do not provide precise control over the process. This lack of control can lead to the release of more fuel than is required by the fuel cell raising a number of safety concerns.

SUMMARY

In one of many possible embodiments, a fuel cartridge is provided including a first chemical reagent, a second chemical reagent, a thermally degradable barrier layer separating the first chemical reagent and the second chemical reagent, wherein the first chemical reagent and the second chemical reagent can spontaneously react to release fuel upon breech of the barrier, and a heater for heating the thermally degradable barrier layer.

BRIEF DESCRIPTION OF THE DRAWINGS

The accompanying drawings illustrate various embodiments of the present invention and are a part of the specification. The illustrated embodiments are merely examples of the present invention and do not limit the scope thereof.

Throughout the drawings, identical reference numbers designate similar, but not necessarily identical, elements.

DETAILED DESCRIPTION

An apparatus and method are described herein for precisely producing fuel while facilitating the storage of gaseous fuel in a non-gaseous state. According to one exemplary implementation, described more fully below, a number of fuel wells containing reagents separated by a thermally degradable barrier are disposed in a plate. When the degradable barrier is removed from between the two reagents through the application of thermal energy, the reagents may react in a substantially spontaneous manner producing fuel that may be supplied to a fuel-consuming system, such as a fuel cell. The present system will be described, for ease of explanation only, in the context of a proton exchange membrane (PEM) fuel cell. However, the fuel cartridges described herein may be used with other types of fuel cells, including alkaline fuel cells (AFC), phosphoric-acid fuel cells (PAFC), solid oxide fuel cells (SOFC), and molten carbonate fuel cells (MCFC). Moreover, the fuel cartridges described herein may be incorporated in any fuel-consuming system.

In the following description, for purposes of explanation, numerous specific details are set forth in order to provide a thorough understanding of the invention. It will be apparent, however, to one skilled in the art that the invention may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
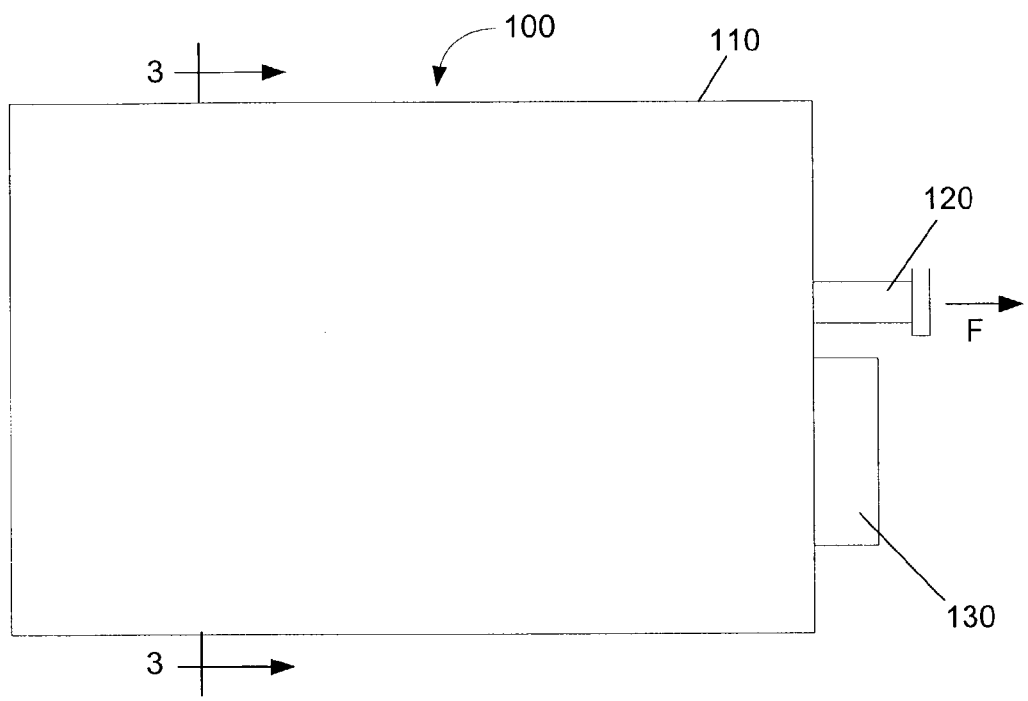
FIG. 1 illustrates a plan view of a fuel cartridge in accordance with one exemplary embodiment.
Figure 5:
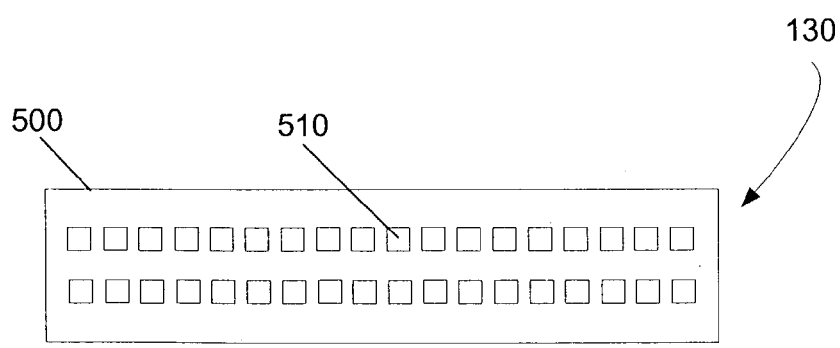
FIG. 5 is a plan view of a contact plate according to one exemplary embodiment.
Figure 6A:
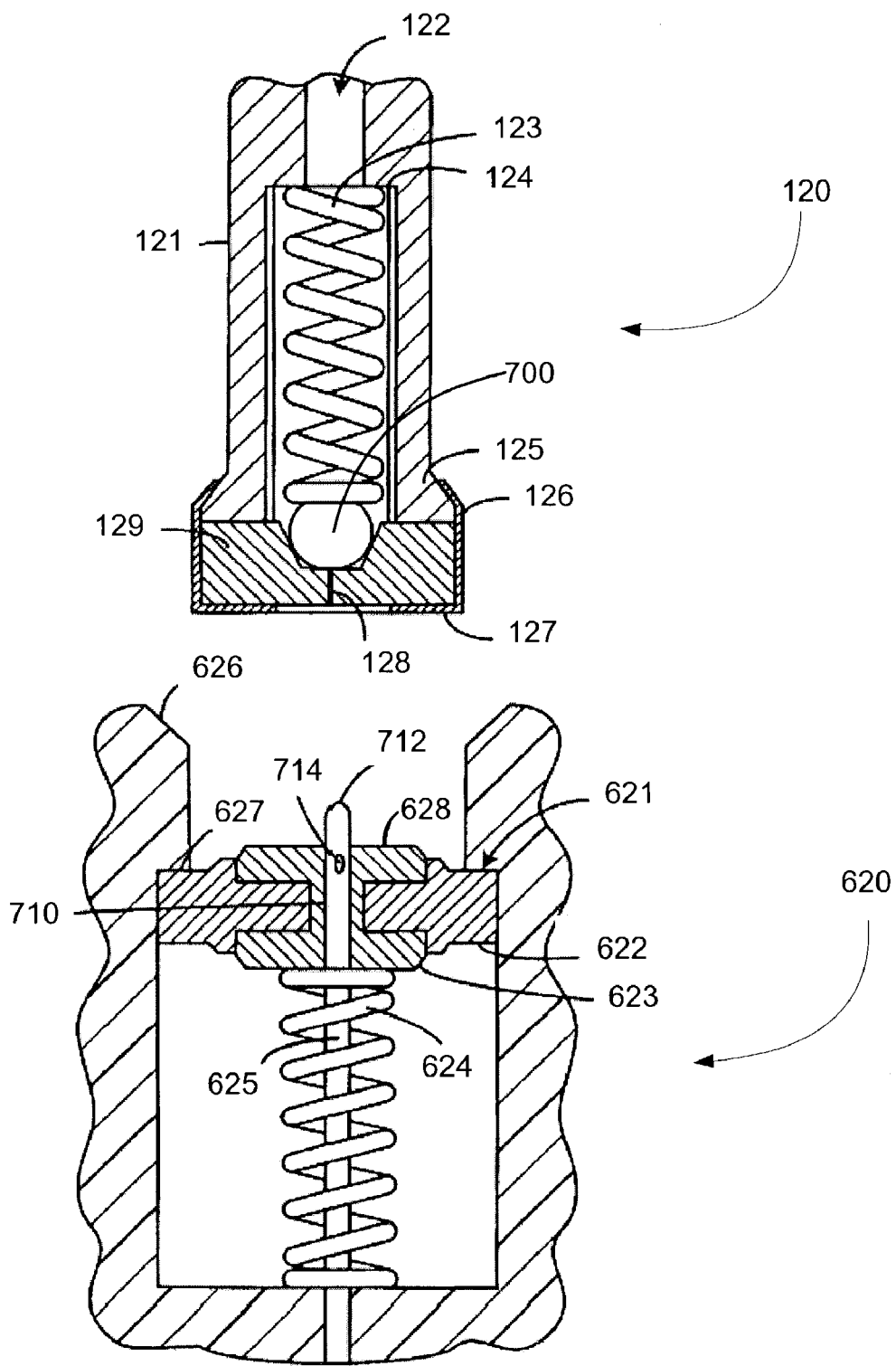
FIG. 6A illustrates a fuel system connector arrangement in a disconnected state according to one exemplary embodiment.

FIG. 1 illustrates an embodiment of a fuel source capable of providing pressurized hydrogen to a fuel-consuming system, such as a fuel cell. As illustrated in FIG. 1, the external structure of a fuel cartridge (100) may include a housing (110), a fluid coupler (120) for fluidly coupling the fuel cartridge (100) to a fuel-consuming system, and an electrical coupler (130) for electrically coupling the fuel cartridge (100) to a fuel-consuming system. The housing (110) of the exemplary fuel cartridge (100) may vary in size according to factors such as the size of the fuel-consuming system being supported and the desired amount of fuel-bearing substance to be stored in the cartridge (100). Fuel that is produced and contained within the fuel cartridge (100) may exit the fuel cartridge (100) by way of the fluid coupler (120) and enter a fuel-consuming system. The fluid coupler (120) also acts as a cap to prevent fuel from entering or exiting the housing (110) unless the fluid coupler (120) has mated with a corresponding connector (620; FIG. 6A) in the manner described below with reference to FIGS. 6A and 6B. Additionally, the electrical coupler (130) allows for the transmission of electrical signals meant for controlling the fuel cartridge (100) as described below with reference to FIGS. 5 and 7.

Figure 2:
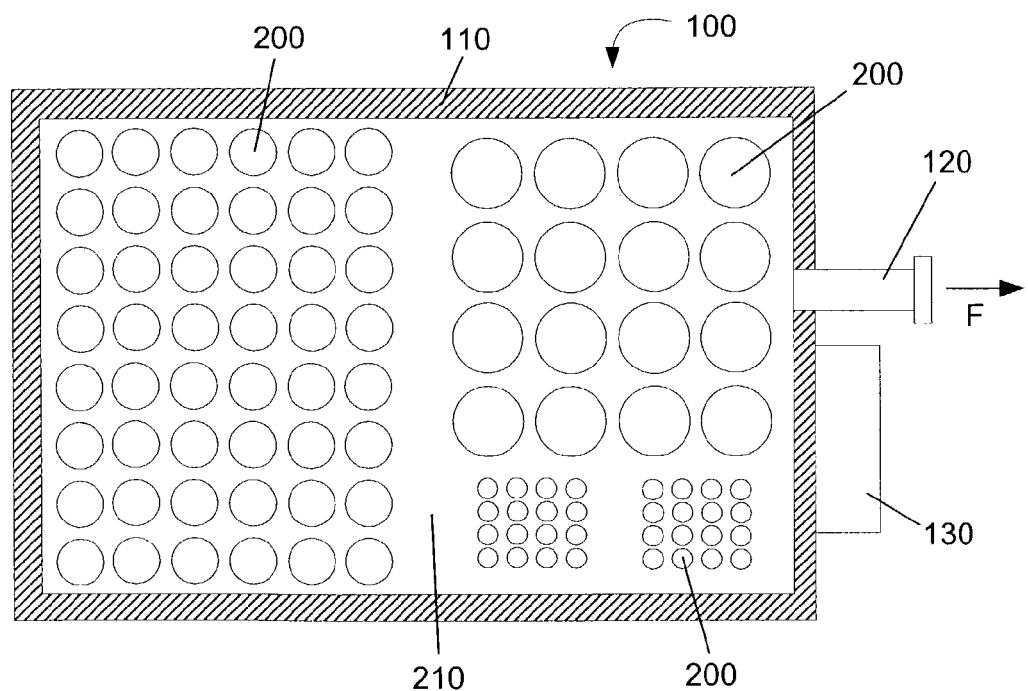
FIG. 2 illustrates a plan, partial section view of the fuel cartridge illustrated in FIG. 1 according to one exemplary embodiment.

FIG. 2 illustrates some of the internal components of an exemplary fuel cartridge (100). As shown in FIG. 2, the fuel cartridge (100) may include one or more fuel wells (200) formed in the body of a plate (210). The fuel wells (200) disposed within the housing (110) may be of any suitable size, shape and/or number. The precision at which the fuel cartridge (100) is able to produce gaseous fuel will increase with the number and variety of fuel wells (200) disposed within the body of the plate (210). The fuel wells (200) formed within the body of the plate (210) illustrated in FIG. 2 may vary in size so that a number of specified quantities of fuel may be produced by consuming a combination of the various fuel well (200) sizes. Additionally, while the present fuel wells (200) are not limited to any particular shape, the density of the fuel wells (200) contained within a fuel cartridge may be maximized by employing a shape that facilitates the minimization of the space between the fuel storage areas such as a hexagon or hexagonal shape. The plate (210) containing the fuel wells (200) may be formed from any material capable of performing the functions specified below including, but in no way limited to, Teflon, glass, PEAK, plastics, styrene, acrylate, styrene butadiene polymers, ceramics, silicon, aluminum, stainless steel 314 or 316, bakelite, polyurethanes, polycarbonate, graphite, carbon, Teflon coated metals, Pyrex materials, or any appropriate combination thereof. Additionally, the plate (210) may be formed using any number of forming processes including but in no way limited to, an injection molding or casting process.

Figure 3A:
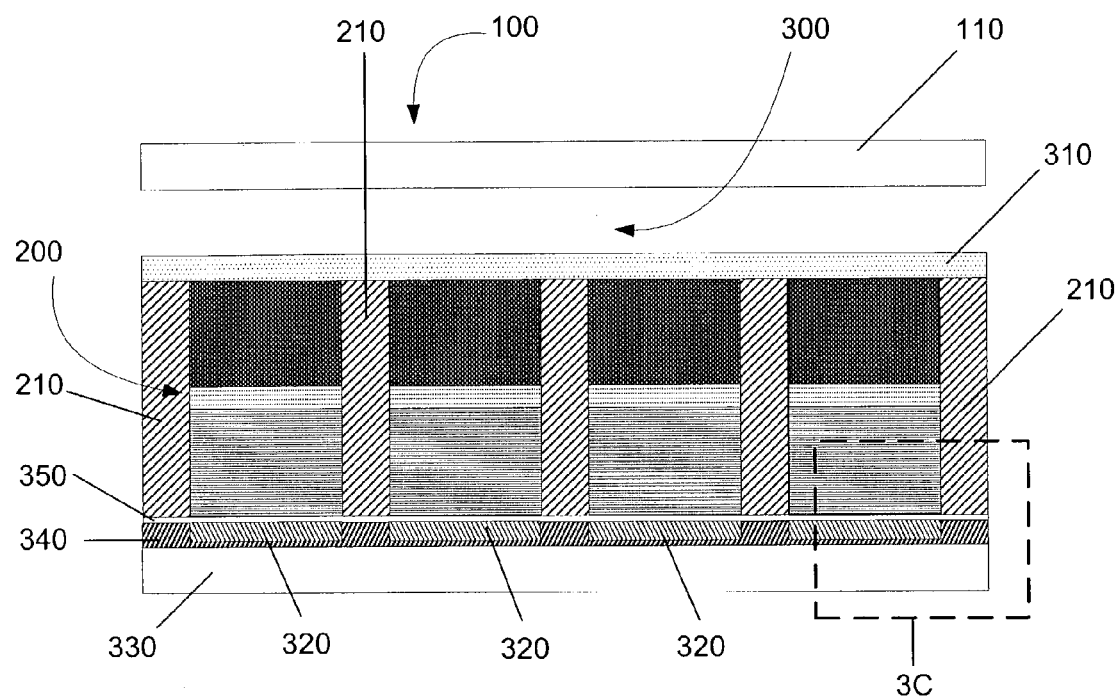
FIG. 3A illustrates a section view taken along line 3–3 in FIG. 1 demonstrating a plurality of exemplary fuel storage areas prior the release of fuel from the fuel containing substance according to one exemplary embodiment.

FIG. 3A is a cross-sectional view illustrating the internal components of an exemplary fuel cartridge (100). As shown in FIG. 3A, an exemplary fuel cartridge may include a base (330) supporting a circuit layer (340) and a number of heaters (320) corresponding to a plurality of fuel wells (200). Disposed between the heaters (320) and the fuel wells (200) is a barrier layer (350). Additionally, portions of the plate (210) laterally separate the fuel wells (200), and the top of each fuel well (200) is covered by a semi-permeable membrane (310). Immediately between the semi-permeable membrane (310) and the housing (110) of the fuel cartridge (100) is an open fuel passage region (300).

The base (330), which also forms part of the housing (110), supports and insulates the fuel cartridge (100). The base (330) and subsequently the housing (110) may be manufactured out of any material capable of maintaining its mechanical, chemical, and electrical properties over a wide range of temperatures including, but in no way limited to plastics such as polyester, polystyrene, Teflon or a polyimide such as Kapton. A circuit layer (340) and a number of heaters (320) may be formed on top of the base (330) as described below with reference to FIG. 3C. Once formed, the circuit layer (340) and the heaters (320) are covered by a barrier layer (350) that has a relatively high thermal conductivity but insulates the circuit layer (340) both electrically and chemically from the fuel wells (200). Suitable materials for the barrier layer (350) may include, but are in no way limited to, silica, silicon dioxide, silicon nitride, silicon carbide, glass, polymers such as polyimides, and epoxy-amine composites.

Immediately above the fuel wells (200) is a semi-permeable membrane (310) that fluidly seals the fuel wells (200). The semi-permeable membrane (310) fluidly seals the fuel wells (200) by restricting the flow of both solids and liquids. However, the semi-permeable membrane is structured such that any gaseous fuels that are produced in the fuel wells (200) may pass through the membrane and into the open fuel passage region (300). The semi-permeable membrane may be manufactured from any material capable of restricting the flow of liquids while permitting the escape of gasses including, but in no way limited to, Teflon, or polypropylene.

Between the semi-permeable membrane (310) and the fuel cartridge housing (110) is an open fuel passage region (300). The open fuel passage region (300) provides a channel for any gaseous fuels that have escaped from the fuel well (200) through the semi-permeable membrane (310). The open fuel passage region (300) may direct the escaping gaseous fuel through the fluid coupler (120; FIG. 1) and into a fuel-consuming system.

Figure 3B:
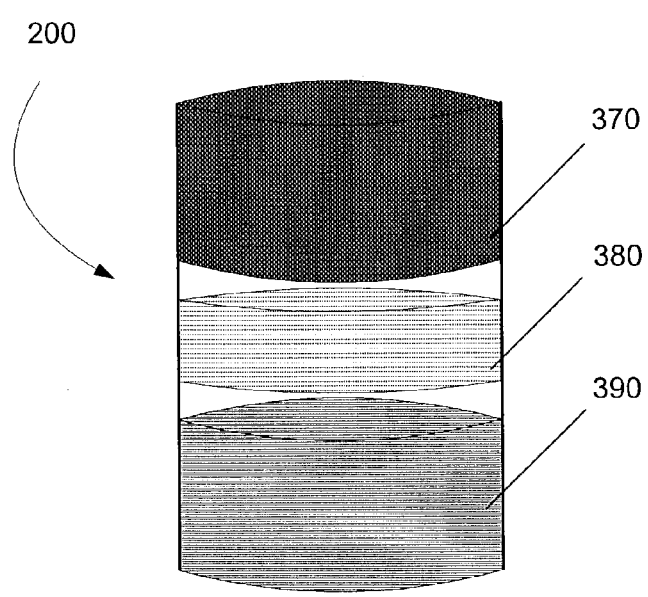
FIG. 3B is an exploded view illustrating the components of an exemplary fuel well according to one exemplary embodiment.

An exemplary fuel well (200) that may be incorporated in the present exemplary embodiment of a fuel cartridge (100) is further illustrated in FIG. 3B. As shown in FIG. 3B, the fuel well (200) may include an upper reagent (370) and a lower reagent (390) chemically separated by a thermally degradable barrier layer (380). A reagent is a chemical agent for use in chemical reactions. As applied to the present fuel cartridge (100), the upper and the lower reagents (370, 390) may be any reagents that, when combined, react in a substantially spontaneous manner to produce a desired product. According to one exemplary embodiment of the present fuel cartridge (100). The upper and lower reagents may include a simple or complex metal hydride and an acid or other proton donor such as water, respectively. When a metal hydride and an acid or other proton donor are allowed to chemically mix, they react in a substantially spontaneous manner producing hydrogen. The metal hydride may be disposed as either the upper reagent (370) or the lower reagent (390) as long as the opposite reagent comprises an acid or other proton donor, which when mixed with the metal hydride produces hydrogen. According to one exemplary embodiment, a metal hydride such as Lithium or sodium borohydride forms the lower reagent (390) and an acid such as hydrochloric acid, phosphoric acid, or polyphosphoric acid forms the upper reagent (370).

As illustrated in FIG. 3B, the upper (370) and the lower (390) reagents are chemically separated by a thermally degradable barrier layer (380). The thermally degradable barrier layer (380) may be comprised of any thermally degradable material that may both chemically separate the upper and lower reagents (370, 390), and be structurally compromised through the application of a predictable quantity of thermal energy. Materials that may be used to form the thermally degradable barrier layer include, but are in no way limited to ampliwax, fats, fatty alcohols; polymeric films similar to those used in laminating films such as acrylate, styrene, styrene butadiene; hot melt materials such as rosin, gum Arabic, polyethylene petroleum jellies, commercially available hot melt glues such as loctite Hysol, wax; or plastics such as polyesters. The thermally degradable barrier layer (380) prevents the upper reagent (370) and the lower reagent (390) from chemically mixing and spontaneously reacting. The thermally degradable barrier layer (380) may be controllably removed from between the upper and lower reagents (370, 390) through the application of thermal energy. The thermally degradable barrier layer (380) may have a determinable melting point between 45 and 450 degrees C. According to one exemplary embodiment, the melting point may be between 70 and 200 degrees C. and according to yet another exemplary embodiment, between 100 and 150 degrees C. Moreover, the melting point of the thermally degradable barrier layer (380) depends upon the material used to form the thermally degradable barrier layer (380). The thermal energy used to compromise the thermally degradable barrier layer may be measurably introduced to the desired fuel well (200) by the circuit layer (340; FIG. 3A) and the heaters (320; FIG. 3A).

Figure 3C:
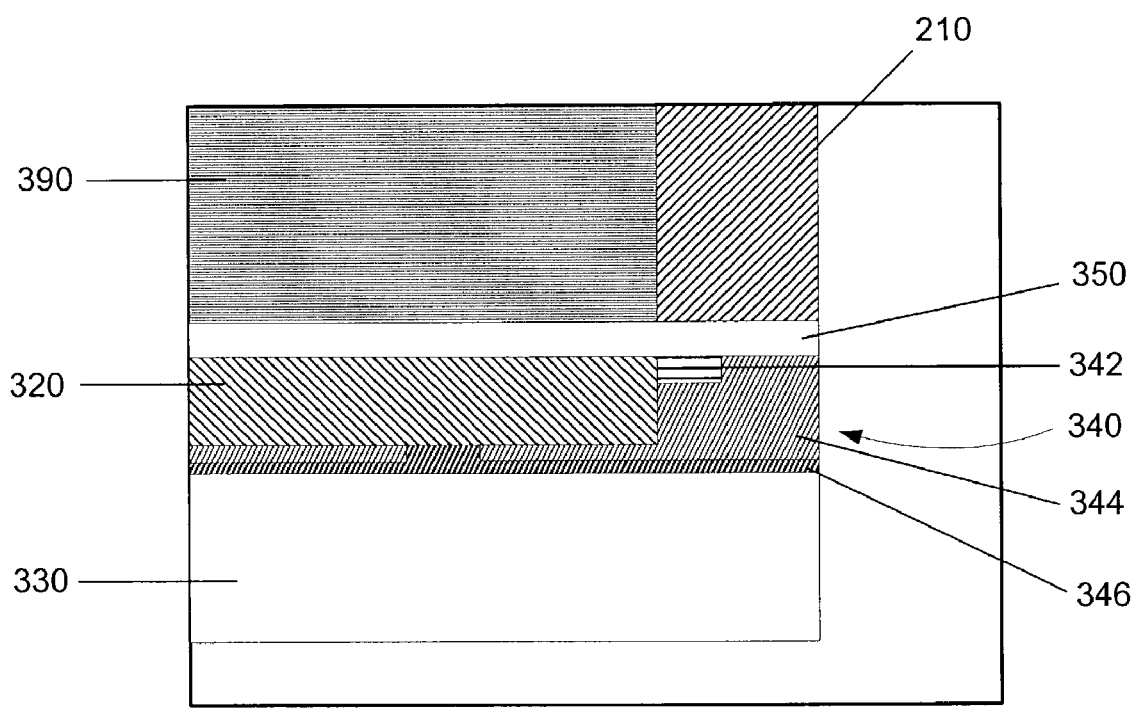
FIG. 3C is an exploded view illustrating a portion of the exemplary embodiment illustrated in FIG. 3 according to one exemplary embodiment.

FIG. 3C is an exploded view further illustrating the thermal energy introducing components of one exemplary embodiment of the present fuel cartridge (100). As shown in FIG. 3C, a heater (320) is disposed immediately below a lower reagent (390), opposite the barrier layer (350). Surrounding the heater (320) is a circuit layer (340) formed on the fuel cartridge base (330). As illustrated in FIG. 3C, the circuit layer (340) may include both a first (342) and a second (346) set of conductors as well as an insulating material (344) electrically isolating the conductors (342, 346) from each other. The first and second set of conductors (342, 346) may selectively control the heaters (320) causing them to supply a controlled amount of thermal energy to the fuel wells (200; FIG. 3A). The circuit layer (340) that controls the heater (320) may be formed on the base (330) by any suitable techniques including, but in no way limited to metal deposition techniques.

Figure 4:
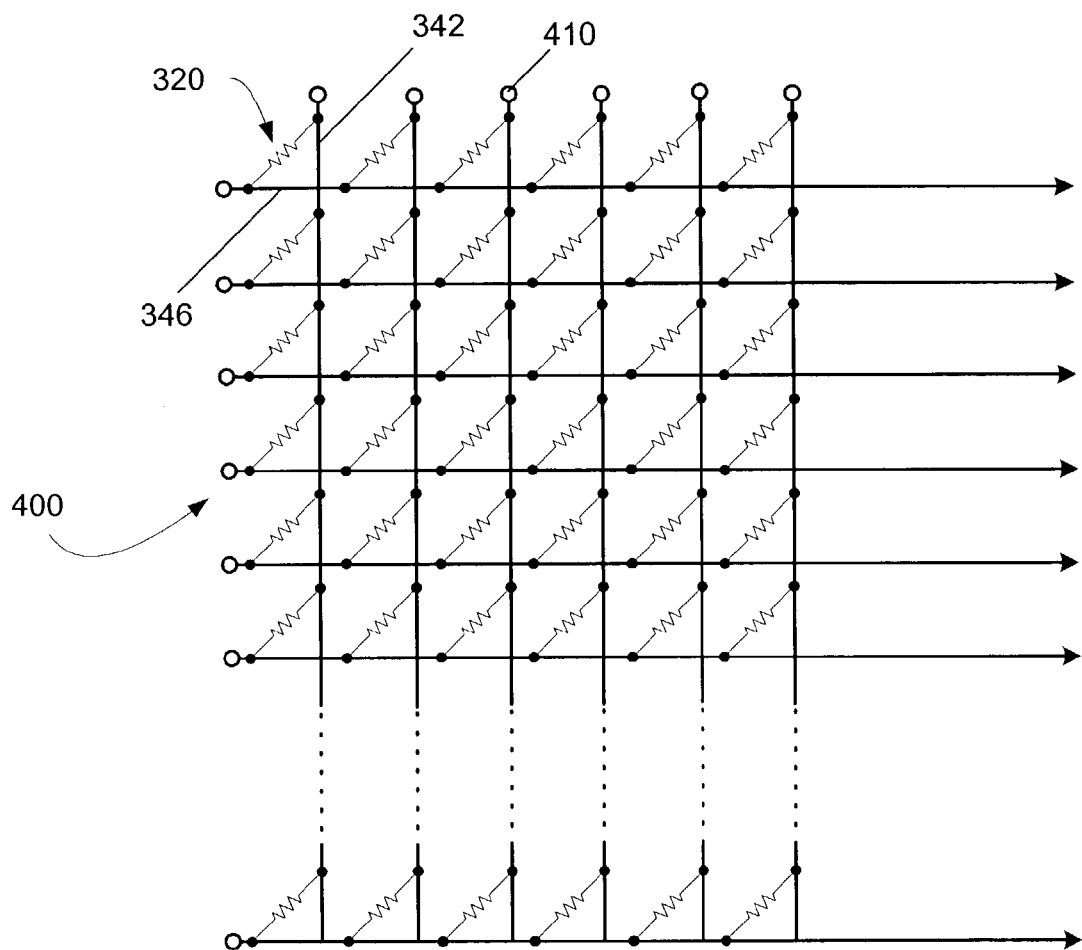
FIG. 4 is a schematic view of a resistor array according to one exemplary embodiment.

FIG. 4 illustrates an exemplary embodiment of a heater array (400) that may be incorporated in the present fuel cartridge (100) to selectively supply thermal energy to one or more fuel wells (200; FIG. 2). The exemplary heater array (400) may include a number of heaters (320) communicatively coupled to a first and a second set of conductors (342, 346). Each conductor having an end (410) for electrically coupling the conductors (342; 346) to a system controller or other computing device (not shown). The heaters (320) may be resistors that are selectively actuated, by driving current through the selected resistor(s), to generate thermal energy that is subsequently applied to the thermally degradable barrier (380) in one or more selected fuel wells (200; FIG. 3A). Another heater that may alternatively be incorporated in the present fuel cartridge (100; FIG. 1) includes, but is in no way limited to, tubes in a heat exchanger through which a heat transfer fluid flows. The fuel wells (200; FIG. 3A), heaters (320) and plate (210; FIG. 3A) are respectively configured such that the actuation of a selected heater will only cause the thermally degradable barrier (380) associated with the selected fuel well (200; FIG. 3A) to be compromised. In this manner, the present configuration allows for the controlled emission of gaseous fuel without substantially heating the thermally degradable barrier (380) of adjacent fuel wells (200; FIG. 3A).

As illustrated for example in FIG. 4, heaters (320) are positioned in an array (400) that corresponds to the array of fuel wells (200; FIG. 3A) disposed on the plate (210; FIG. 2). The exemplary heater array (400) illustrated in FIG. 4, which is substantially similar to those employed in ink jet printing devices, is arranged in rows and columns and includes a first set of conductors (342) and a second set of conductors (346). Each heater (320) is connected to one of the first sets of conductors (342) and one of the second sets of conductors (346). A selected heater (320) in the exemplary array (400) may be activated by connecting the corresponding first conductor (342) to a voltage source and a corresponding second conductor (346) to ground. Multiple heaters (320) may be simultaneously activated by either connecting one first conductor (342) to a voltage source and a plurality of second conductors (346) to ground, by connecting a plurality of first conductors (342) to a voltage source and a plurality of second conductors (346) to ground, or by connecting a plurality of first conductors (342) to a voltage source and a single second conductor (346) to ground. Such an arrangement, which is sometimes referred to as a "passive multiplexing" arrangement, may also include additional resistors or diodes to limit current flow in a desired direction (not shown) that are used to control and dissipate parasitic power. One example of a passive multiplexing arrangement is disclosed in the ink jet printer context in U.S. Pat. No. 5,504,471, which is assigned to the Hewlett-Packard Company and incorporated herein by reference.

The illustrated embodiment of the heater array (400) includes one heater (320) for each fuel well (200; FIG. 2). However, it is possible that the heater/fuel storage area ratio may be varied from cartridge to cartridge or within a single cartridge. For example, there could be a plurality of heaters (320) corresponding to a single fuel well (200; FIG. 2) or a single heater (320) may provide thermal energy to a plurality of fuel wells (200; FIG. 2). Moreover, the fuel well containing plate (210) and the circuit layer (340; FIG. 3A) of the present fuel cartridge (100) may be separable plates manufactured so as to be precisely coupled together thereby aligning the heaters in thermal contact with the fuel wells (200). It should also be noted that the present fuel cartridge (100; FIG. 1) is not limited by the use of any particular heater system. For example, resistors and/or other heater devices, may be controlled by way of an addressing system such as those disclosed in the ink jet printer context in commonly assigned U.S. Pat. Nos. 5,644,342 and 6,007,186, which are assigned to the Hewlett-Packard Company and incorporated herein by reference.

Figure 7:
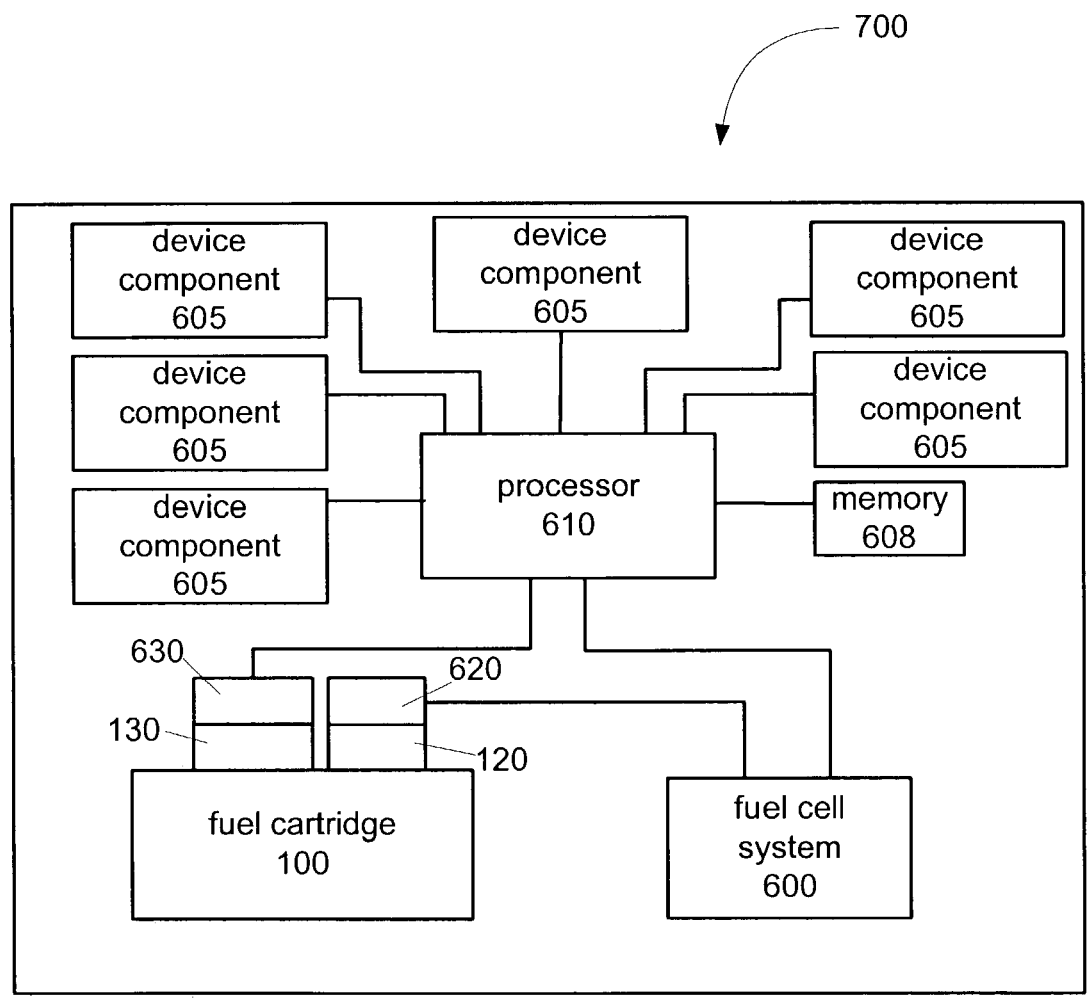
FIG. 7 is a schematic block diagram of a notebook computer and fuel cartridge according to one exemplary embodiment.

Additionally, the actuation of the heaters (320) may be controlled by the system processor (610; FIG. 7) (or a separate controller) along with the other components and subsystems that may control the exemplary PEM fuel cell system. A feedback loop is one exemplary method that may be incorporated to control the production of fuel within the fuel cartridge (100). Such control would determine the rate of fuel production in addition to monitoring whether or not gaseous fuel F is being produced at all.

The exemplary fuel cartridge (100) illustrated in FIG. 1 also includes an electrical coupler (130; FIG. 1) that is used to electrically couple the fuel cartridge (100) to a fuel-consuming device. FIG. 5 illustrates an exemplary contact pad (500) that may be disposed within the electrical coupler (130). As illustrated for example in FIG. 5, each of the conductors (342, 346; FIG. 4) includes an end (410; FIG. 4). Each end (410; FIG. 4) may in turn be connected to a contact pad (510). The contact pads (510) are arranged in suitable fashion on a contact plate (500) disposed within the electrical coupler (130) to mate with corresponding elements in an electrical connector (630; FIG. 7) in the host device. This connection allows the host device to be communicatively coupled to and to selectively control the actuation of the heaters (320).

The exemplary fuel cartridge (100; FIG. 1) also includes a fluid coupler (120) that may fluidly couple the fuel cartridge (100) to a fuel-consuming system. Although the present fuel cartridge (100; FIG. 1) is not limited to any particular arrangement for the coupling of the fuel cartridge to the host fuel-consuming device, the preferred coupling arrangement is a self-sealing coupler arrangement that prevents leakage. With such a self-sealing arrangement, seals will be maintained at the fuel cartridge coupler (120) and the host system connector (620; FIG. 6A) when the two are connected to, and disconnected from, one another. One example of a self-sealing connector arrangement that may be used in conjunction with the present fuel cartridge is illustrated in FIGS. 6A and 6B.

As illustrated in FIG. 6A, the exemplary fuel cartridge connector (120) includes a hollow cylindrical boss (121) having an inwardly projecting edge (124) and a lumen (122) that opens into the open region (110; FIG. 2) within the fuel cartridge housing (110; FIG. 2). The end (125) of the fuel cartridge connector (120) may include a compliant septum (129) including a slit (128). The compliant septum (129) may be secured to the fuel cartridge connector (120) by a crimp cap (126). A spring (123) (or other biasing device) and a sealing ball (700) are positioned between the compliant septum (129) and the inwardly projecting edge (124). The length of the spring (123) is such that the spring biases the sealing ball (700) against the septum (129) to form a fluid tight seal. The end (127) of the crimp cap (126) includes an opening that is aligned with the slit (128) in the septum (129).

Figure 6B:
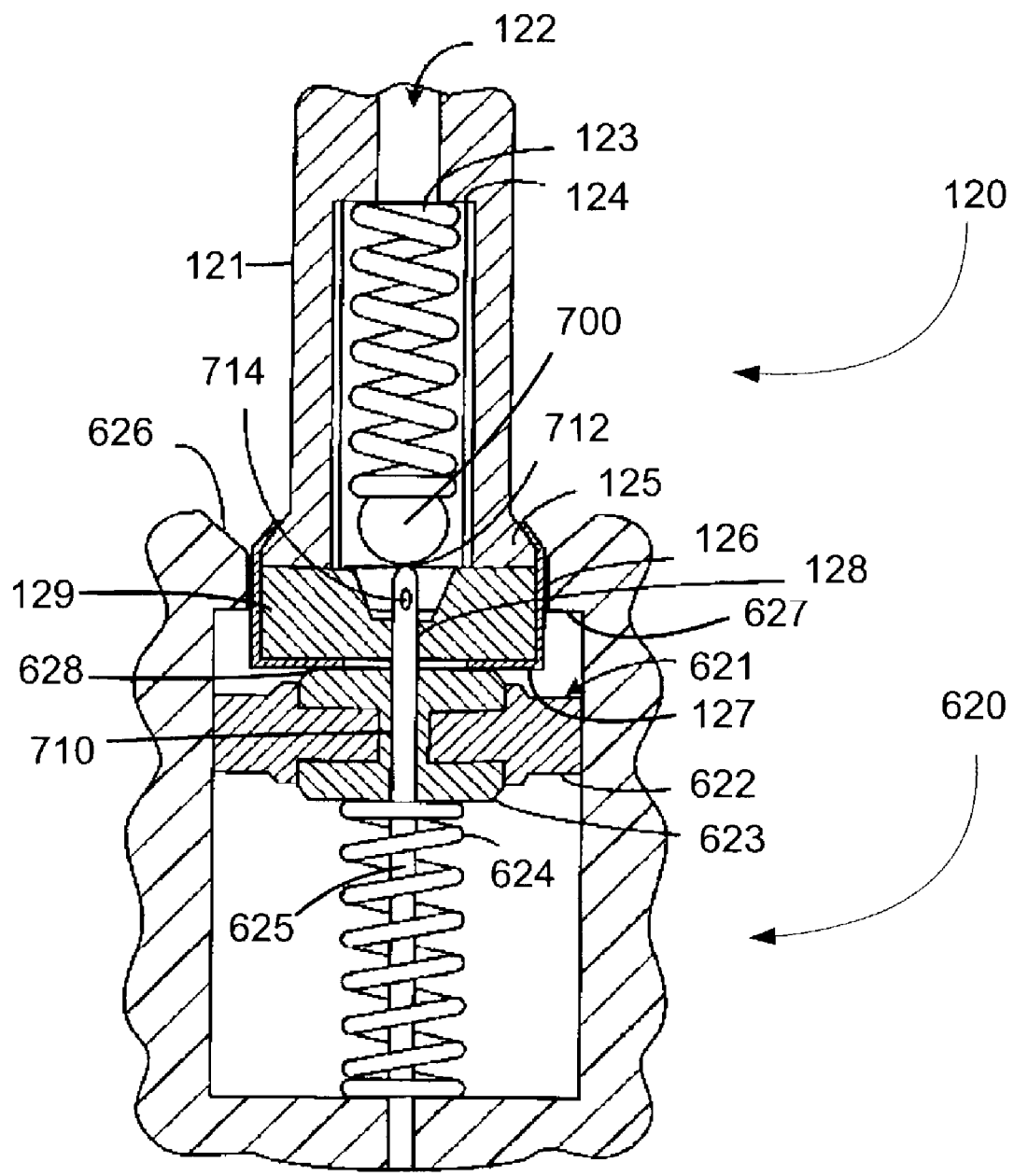
FIG. 6B illustrates a fuel system connector arrangement in a connected state according to one exemplary embodiment.

The host device connector (620) illustrated in FIGS. 6A and 6B may include a needle (625) having a closed end (712), a lateral orifice (714), and a bore that extends from the lateral orifice (714) axially through the needle (625). A sliding collar (621), which surrounds the needle (625), is biased by a spring (624) (or other biasing device) against an annular stop (627). The sliding collar (621) may include a compliant sealing portion (623) and a substantially rigid retaining portion (622). The compliant sealing portion (623), according to one exemplary embodiment, includes an exposed upper surface (628) and an inner surface (710) that is in substantial contact with the needle (625). In the disconnected position illustrated in FIG. 6A, the lateral orifice (714) is surrounded and sealed by the sealing portion inner surface (710). The host device connector (620) also includes a tapered lead-in portion (626) that guides and centers the fuel cartridge connector (120) as it moves into the connected position illustrated in FIG. 6B.

Once the fuel cartridge connector (120) establishes a connection between the fuel cartridge (100; FIG. 1) and a host device as illustrated in FIG. 6B by being inserted into the host device connector (620), the closed end (712) of the needle (625) passes through the septum slit (125). The septum (129) should, therefore, be sufficiently compliant to allow the needle (625) to be inserted without large insertion forces, yet stiff enough to provide a tight seal once the needle has been removed. As the needle (625) passes through the septum (129) into the cylindrical boss (121), the sliding collar (621) and the sealing ball (700) will be urged in opposite directions until the lateral orifice (714) is exposed. This configuration establishes fluid communication between the fuel cartridge (100; FIG. 1) and the host fuel-consuming device (not shown).

Moreover, the exemplary fuel cartridge (100) and the host device connector (620) may have corresponding shapes and a mechanical keying apparatus (not shown), such as a rail and slot arrangement, to prevent the fuel cartridge from being inserted improperly and, in many instances, prevent the wrong type of fuel cartridge from being connected to the host fuel-consuming device. A suitable locking device, such as a latch (not shown), may also be provided to mechanically secure the fuel cartridge in place. A relatively small fuel cartridge (100) (as compared to the host device) could be inserted into the host fuel-consuming device, while relatively large fuel cartridges may be mounted on the exterior of a host fuel-consuming device.

Figure 11:
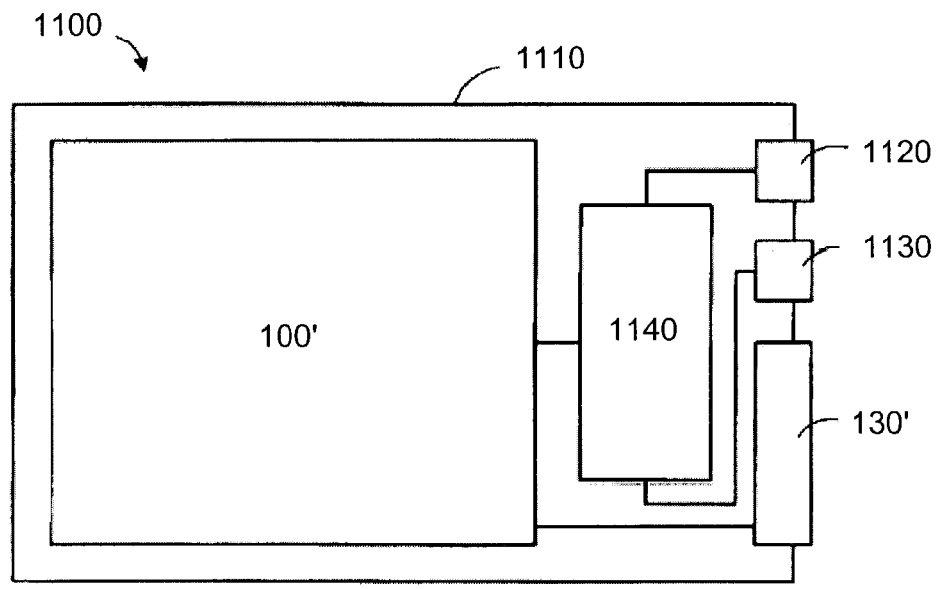
FIG. 11 is a schematic block diagram of an electrochemical cell device incorporating the present fuel cartridge according to one exemplary embodiment

FIG. 7 is a schematic block diagram illustrating an exemplary embodiment of the present fuel cartridge (100; FIG. 1) incorporated into a fuel-consuming system (700) such as a fuel cell powered notebook computer. Other exemplary fuel-consuming systems may include, but are in no way limited to, personal digital assistants, digital cameras, portable telephones, portable electronic games, and electrically powered automobiles. The present fuel cartridges may also be used in conjunction with stand alone power generators, such as the electrochemical cells described below with reference to FIGS. 11 and 12, that may be connected to separate power consuming devices in order to provide power thereto.

As illustrated in FIG. 7, the fuel-consuming system (700) may include a fuel cartridge (100) fluidly coupled to a fuel cell system (600), or other fuel consuming/power generating device, that is subsequently connected to various electrical loads (605, 610) within the fuel-consuming system. The fuel cell system (600) illustrated in FIG. 7 is, according to one embodiment, a fuel cell stack comprising a plurality of cells. While the present fuel cartridge is not limited to any particular type of fuel cell system, the fuel cell system (600) illustrated in FIG. 7 may be a PEM fuel cell, including an anode and a cathode separated by a proton exchange membrane (not shown). The pressurized connection between the fuel cartridge and the fuel cell system of the fuel-consuming system (700) is facilitated by a fuel cartridge coupler (120) and a host device coupler (620) as described above.

The electrical loads (605, 610) that are connected to the fuel cell system (600) illustrated in FIG. 7 may include a processor (610) and component devices (605). If, by way of example only, the fuel-consuming system (700) is a fuel cell powered notebook computer, the component devices (605) connected to the fuel cell system (600) may include, but are in no way limited to, a user interface including a keyboard, a touch pad, and/or a mouse; storage modules such as a ZIP drive, a compact disk drive, a floppy drive; a cooling fan; a modem; a battery; etc. The processor (610) is communicatively coupled to the fuel cartridge (100) through the electrical coupler (130) and a corresponding system electrical coupler (630). The processor (610) is also communicatively coupled to a memory storage device (608), which when accessed, provides the processor (610) with instructions for selectively controlling the release of fuel from the fuel cartridge (100) by selectively controlling the actuation of desired heaters (320; FIG. 3A).

Exemplary Implementation and Operation

Figure 8:
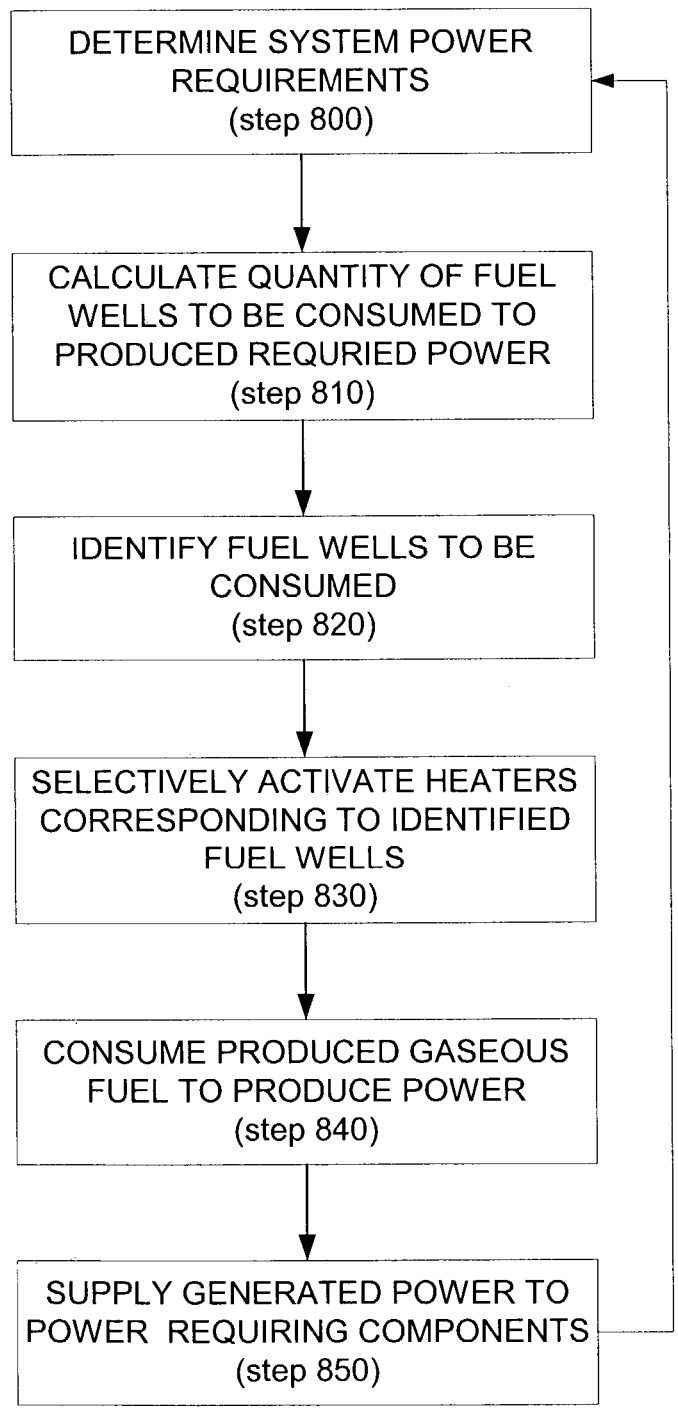
FIG. 8 is a flow chart illustrating a method for producing gaseous fuel according to one exemplary embodiment.

FIG. 8 illustrates an exemplary embodiment of a method for incorporating the present fuel cartridge (100; FIG. 1) into a fuel-consuming system (700; FIG. 7). As illustrated in FIG. 8, once the fuel cartridge (100; FIG. 1) has been appropriately coupled to the fuel-consuming system (700; FIG. 7), the processor (610; FIG. 7) begins to control the release of fuel from the fuel cartridge (100; FIG. 1) by estimating the power required by the fuel cell system (600) in order to satisfy the processor's future processing needs and future electrical loads (step 800). This estimation may be performed based upon past operating averages or other operating parameters such as current draw or voltage.

Once the power requirements have been estimated, the processor (610; FIG. 7) calculates the quantity of fuel wells (200; FIG. 2) to be used in order to produce fuel for the fuel cell system (600). The number of fuel wells (200; FIG. 2) selected corresponds to the quantity of fuel required in order to meet calculated power demands (step 810). The calculation of fuel wells required may be performed by the processor (610; FIG. 7) based upon a conversion of reagent volume contained within a fuel well to the amount of power produced by the fuel cell system (600) when consuming the fuel produced by the identified fuel well (200; FIG. 2). The appropriate quantity of required fuel wells is calculated and appropriate fuel wells (200; FIG. 2) are identified within the fuel cartridge (100; FIG. 1) to be consumed (step 820).

Once the fuel wells (200; FIG. 2) have been identified, the heaters (320; FIG. 3A) in the exemplary fuel cartridge (100; FIG. 1) may be selectively actuated (step 830) to produce the desired fuel. The processor (610; FIG. 7) may selectively actuate the heaters (320; FIG. 3A) by transmitting a signal through the system electrical coupler (630; FIG. 7) and the corresponding electrical coupler (130; FIG. 7) that connect the identified heaters to a voltage source and ground within the fuel-consuming system (700; FIG. 7). Once the heaters (320; FIG. 3A) are actuated, those heaters heat the identified fuel wells (200; FIG. 2) until sufficient thermal energy has been supplied to the fuel well to cause the structural degradation of the thermally degradable barrier (380; FIG. 3B) that is chemically separating the upper and the lower reagents (370, 390; FIG. 3B). Once the thermally degradable barrier (380; FIG. 3B) no longer separates the reagents (370, 390; FIG. 3B), the reagents may spontaneously react producing a gaseous fuel F such as hydrogen.

Figure 9:
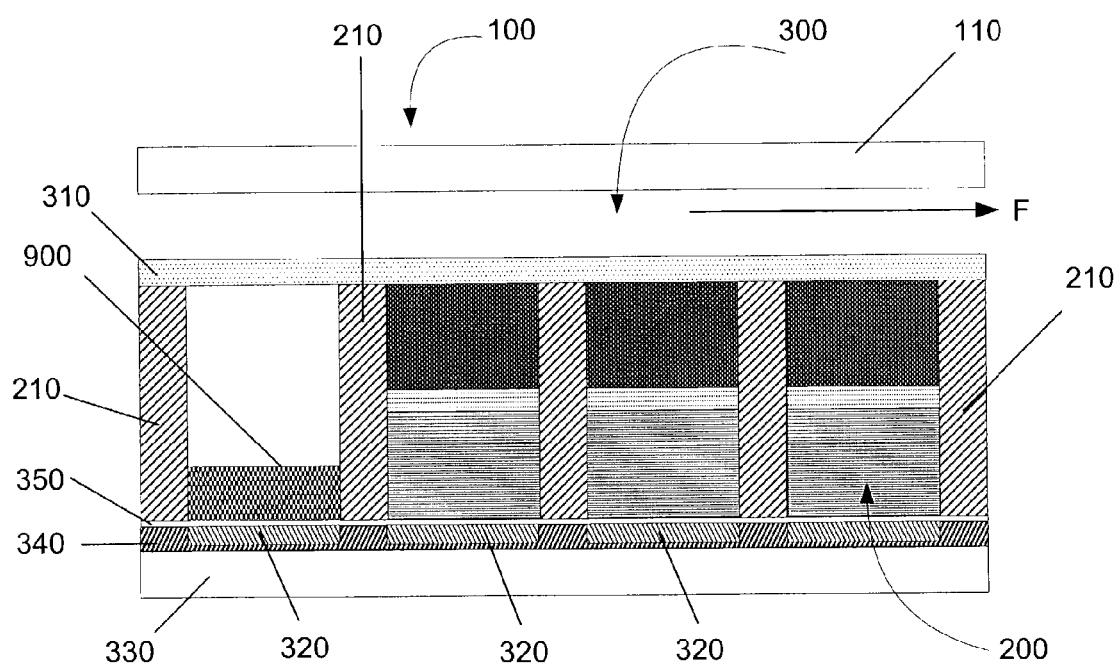
FIG. 9 is a section showing the plurality of exemplary fuel storage areas illustrated in FIG. 3 after fuel has been released from a fuel well according to one exemplary embodiment.

The arrow in FIG. 9 illustrates the flow of the gaseous fuel F once it has been produced. The gaseous fuel F, once produced may permeate the semi-permeable film (310) that covers the fuel wells (200). As the gaseous fuel F passes through the semi-permeable film (310), it is introduced into the open fuel passage region (300). The open fuel passage region then directs the gaseous fuel F towards and through the fluid coupler (120; FIG. 7) and into the fuel cell system (600; FIG. 7).

In order to provide instant pressure to the fuel leaving the fuel cartridge, (100; FIG. 1), the open fuel passage region (300) may be filled with a small amount of pressurized fuel (such as hydrogen gas) during the fuel cartridge manufacturing process. This pressurized fuel, which will flow under pressure to the fuel cell system (600) when the fuel cartridge (100; FIG. 1) is coupled to the fuel-consuming system (700; FIG. 7), may then be used to fuel the fuel cell system (600; FIG. 7) prior to actuation of the heaters (320). Alternatively, one or more of the heaters (320) may be actuated when the cartridge (100) is initially connected to the fuel-consuming system (700; FIG. 7) or the first time the fuel-consuming system is used after the initial connection, in order to create a sufficient amount of pressurized fuel to fuel the fuel cell system (600; FIG. 7). The fuel-consuming system (700; FIG. 7) may also include a battery (not shown) to provide power prior to the initial transfer of fuel to the fuel cell system (600; FIG. 7). Such power would be used to, for example, power the system processor (610; FIG. 7) prior to the production of power by the fuel cell system (600).

As illustrated, for example in FIG. 9, after the fuel well (200) has been heated to an appropriate temperature and the gaseous fuel F has been released, the remaining reaction products within the fuel well (200) will form either a solid or liquid waste material (900) that is not allowed to pass through the semi-permeable membrane (310). The semi-permeable membrane (310) thereby prevents the waste material (900) from leaving the fuel well (200) and interfering with the flow of the gaseous fuel F being released by other fuel wells (200).

Returning again to FIG. 8, once the gaseous fuel F, such as hydrogen, reaches the fuel cell system (600; FIG. 7), the gaseous fuel F is supplied to an anode and oxygen is supplied to a cathode. In the illustrated embodiment, oxygen may be supplied to the fuel cell stack by drawing ambient air into the stack through a vent (not shown). The appropriate chemical reaction takes place as the gaseous fuel F is consumed as power is produced (step 840).

Once the gaseous fuel F has been consumed to produce the power required for the host system (step 840), the power is transmitted to the processor (610; FIG. 7) where it is either consumed by the processor or distributed to component devices (605; FIG. 7) to enable the performance of power requiring operations (step 850). Alternatively, the power produced by the fuel cell system (600; FIG. 7) may be transmitted to and stored by a battery (not shown) that forms a part of the fuel-consuming system (700; FIG. 7). Upon reception of the power, the processor (610; FIG. 7) again estimates the power required by the fuel-consuming system (700; FIG. 7) and the process begins again as illustrated by the feed back arrow of FIG. 8.

Alternative Embodiments

Figure 10:
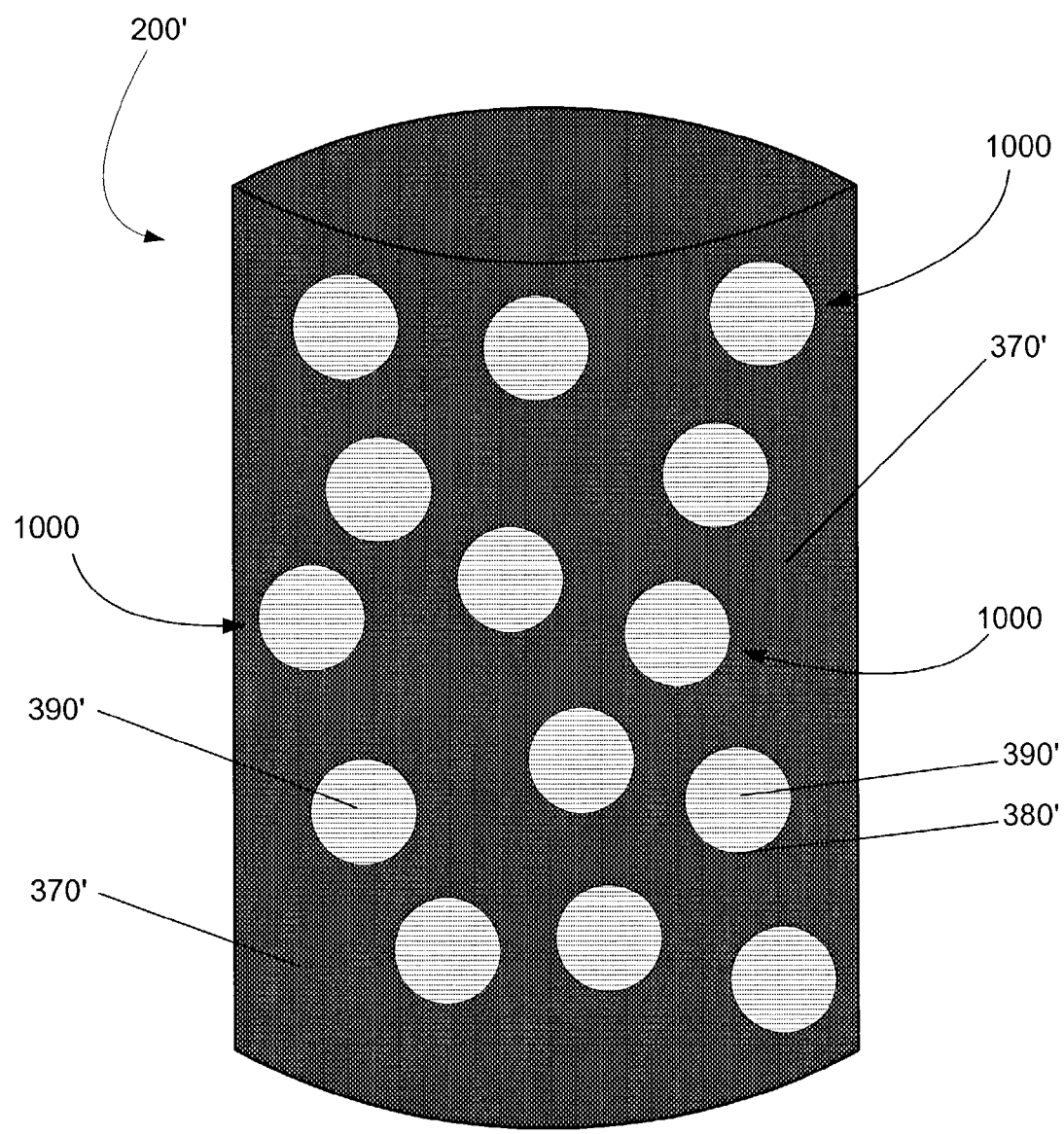
FIG. 10 illustrates an alternative fuel well structure according to one exemplary embodiment.

According to one alternative embodiment, illustrated in FIG. 10, a fuel well (200') may contain a first reagent (370') substantially filling the fuel well (200'). A number of spherically shaped micro-capsules (1000) may then be suspended within the first reagent (370'). The micro-capsules (1000) suspended in the first reagent (370') may have a thin wall of thermally degradable material (380') containing a second reagent (390') and preventing any reaction between the first reagent (370') and the second reagent (390'). The thermally degradable material (380') used to form the microcapsules of this exemplary embodiment may include, but is in no way limited to, natural macromolecules such as gelatin, gum Arabic, and sodium alginate; semi-synthetic macromolecules such as carboxymethyl cellulose, and ethyl cellulose; synthetic macromolecules such as polyvinyl alcohol, nylon, polyurethane, polyester, epoxy, and melanin-formalin; oil and fat such as wax; and inorganic materials such as colloidal silica. These materials may be used singly or in compound.

According to this alternative embodiment, thermal energy may be applied to the fuel well (200') causing the thermally degradable material (380') to structurally degrade and release the second reagent (390'). Once the second reagent (390') is released, it may react with the first reagent (370') in a substantially spontaneous manner producing a desired gaseous fuel F. It is possible that a first and a second reagent may be chemically separated by any number of thermally degradable material and in any number of physical configurations.

In yet another embodiment, the present fuel cartridge is incorporated into electrochemical cell devices, such as fuel cells and batteries, which may be used to power electricity-consuming devices (e.g. notebook computers, personal digital assistants, digital cameras, portable telephones and games). As illustrated for example in FIG. 11, an electrochemical cell device (1100) in accordance with one exemplary embodiment includes a housing (1110), a fuel cartridge (100'), a fuel cell stack (1140) which receives fuel from the fuel cartridge and oxygen from ambient air that enters the housing by way of a vent, and a pair of contacts (1120, 1130) that connect the stack to a host device. The electrochemical cell stack (1140) may be any suitable stack including, but in no way limited to, a PEM-based stack of membrane electrode assemblies.

The fuel cartridge (100') is substantially similar to the cartridge (100; FIG. 1) described above in that it includes a plurality of fuel wells (200; FIG. 2) that respectively store a number of reagents separated by thermally degradable barrier layers (380; FIG. 3B) and a plurality of heaters (320; FIG. 3A) to selectively heat the thermally degradable barrier layers (380; FIG. 3B). In the present embodiment, however, the heaters (320; FIG. 3A) within the fuel cartridge (100') may be actuated by way of an electrical connector (130') that is mounted on the housing (1110), as opposed to the fuel cartridge itself. The fuel cartridge (100') may also be either removable or permanently positioned within the housing (1110). In those instances where the fuel cartridge (100') is removable, the fuel cartridge (100') and fuel cell stack (1140) may be respectively provided with mating connectors, such as the connectors described above with respect to FIGS. 6A and 6B.

Figure 12:
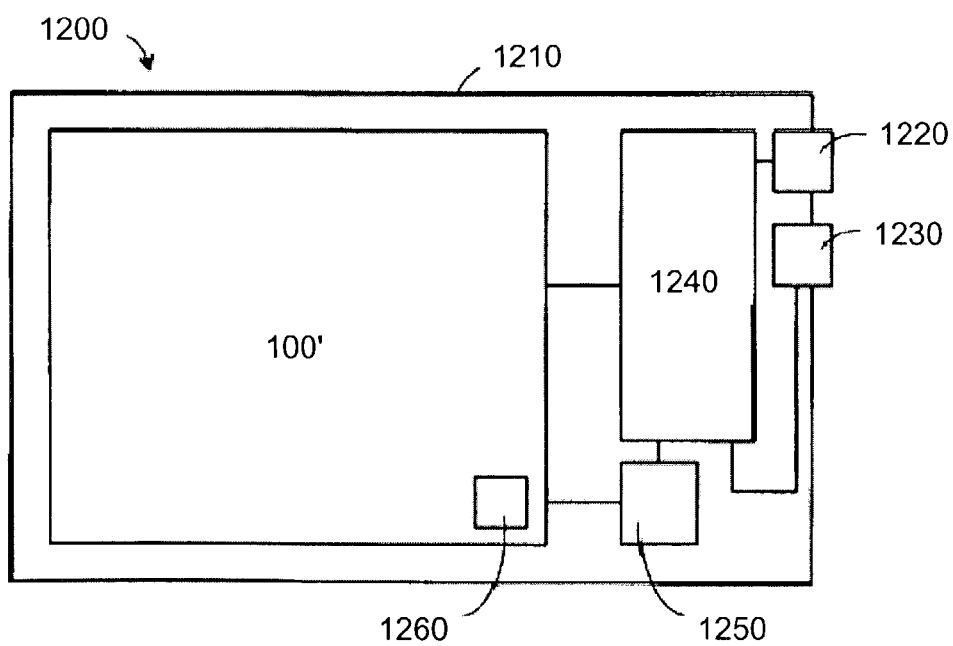
FIG. 12 is a schematic block diagram of an electrochemical cell device incorporating the present fuel cartridge according to one exemplary embodiment.

Another exemplary electrochemical cell device (1200) is generally represented in FIG. 12. The electrochemical cell device (1200) illustrated in FIG. 12 is substantially similar to the electrochemical cell device (1100) illustrated in FIG. 11 in that it includes a housing (1210), a fuel cartridge (100'), a fuel cell stack (1240) and a pair of contacts (1220, 1230). However, according to this embodiment, the electrochemical device is self-controlling and self-actuating. As such, there is no need for an electrical connector to connect the heaters to the host device. Rather, the exemplary electrochemical cell device (1200) includes a controller (1250) that controls the heaters (320; FIG. 3A) (and, therefore, the production of gaseous fuel) based on the load on the fuel cell stack (1240). The exemplary electrochemical cell device (1200) is also provided with a small battery (1260) that provides the power for the heaters (320; FIG. 3A), which may be recharged by the fuel cell stack (1240).

Although the exemplary embodiments have been described in terms of the preferred embodiments above, numerous modifications and/or additions to the above-described preferred embodiments would be readily apparent to one skilled in the art. By way of example, but not limitation, the various components of the exemplary fuel cartridges described above may be interchanged. Fuel cartridges in accordance with the present teachings may also include a fuel cell bi-product reservoir to store bi-product from the operation of the fuel cell in those instances where it is not practicable to vent the bi-product out of the host device. It is intended that the scope of the present cartridge extend to all such modifications and/or additions.

In conclusion, the present fuel cartridge, in its various embodiments, simultaneously facilitates the storage of gaseous fuel in a non-gaseous state while providing for precise release of a gaseous fuel. Specifically, the present fuel cartridge provides an apparatus for separating multiple reagents with a thermally degradable layer, wherein thermal energy may be selectively applied to the thermally degradable layer initiating a chemical reaction that will produce a desired gaseous fuel. As a result, the present fuel cartridge provides increased safety and energy density as compared to fuel cartridges that store fuel in a gaseous state. The present fuel cartridge also allows the release of the gaseous fuel to be precisely controlled by simply controlling the actuation of a number of heaters.

The preceding description has been presented only to illustrate and describe exemplary embodiments. It is not intended to be exhaustive or to limit the exemplary embodiments to any precise form disclosed. Many modifications and variations are possible in light of the above teaching. It is intended that the scope be defined by the following claims.

What is claimed is:

1. A fuel cartridge comprising: a plurality of fuel storage areas that respectively store a first chemical reagent, a second chemical reagent, and a thermally degradable barrier separating said first chemical reagent and said second chemical reagent wherein said first chemical reagent and said second chemical reagent, if allowed to react, produce fuel; and a plurality of independently-addressable heaters, associated with said fuel storage areas, for heating said thermally degradable barriers in said fuel storage areas.

2. The fuel cartridge of claim 1, wherein said first chemical reagent produces hydrogen upon reaction with said second chemical reagent.

3. The fuel cartridge of claim 2, wherein said first chemical reagent comprises a metal hydride.

4. The fuel cartridge of claim 3, wherein said second chemical reagent comprises water.

5. The fuel cartridge of claim 2, wherein said second chemical reagent comprises an acid.

6. The fuel cartridge of claim 1, wherein said thermally degradable barrier layer comprises a wax.

7. The fuel cartridge of claim 1, wherein said thermally degradable barrier layer comprises a naturally occurring fat.

8. The fuel cartridge of claim 1, wherein said thermally degradable barrier layer comprises a polymer material.

9. The fuel cartridge of claim 1, wherein said first reagent is encapsulated within said thernally degradable layer.

10. The fuel cartridge of claim 9, wherein said encapsulated first reagent is disposed within said second reagent.

11. The fuel cartridge of claim 1, wherein said addressable heaters comprise resistors.

12. The fuel cartridge of claim 1, further comprising a plurality of conductors wherein each of said heaters is coupled to two of said conductors.

13. The fuel cartridge of claim 12, wherein no two heaters are coupled to the same two conductors.

14. The fuel cartridge of claim 13, further comprising an electrical connector coupled to each of said conductors.

* * * * *